United States Patent [19]

Nirumandrad

[11] Patent Number: 4,862,396
[45] Date of Patent: Aug. 29, 1989

[54] ANALYZING ANALOG QUADRATURE SIGNALS

[75] Inventor: Mohammadreza Nirumandrad, Columbia, S.C.

[73] Assignee: Industrial Microsystems, Inc., W. Columbia, S.C.

[21] Appl. No.: 112,107

[22] Filed: Oct. 20, 1987

[51] Int. Cl.$^4$ .............................................. G01C 25/00
[52] U.S. Cl. ............................. 364/571.02; 364/561; 250/237 G; 377/22
[58] Field of Search ................. 250/237 G; 377/22; 356/373; 33/125 C; 364/571, 734, 561

[56] References Cited

U.S. PATENT DOCUMENTS

| | | | |
|---|---|---|---|
| 4,047,007 | 9/1977 | Blugos et al. | 377/22 |
| 4,062,005 | 12/1977 | Freed et al. | 340/198 |
| 4,079,251 | 3/1978 | Osann, Jr. | 250/231 |
| 4,152,579 | 5/1979 | Feinland | 235/92 |
| 4,180,704 | 12/1979 | Pettit | 250/237 |
| 4,318,617 | 3/1982 | Orsen | 356/373 |
| 4,346,447 | 8/1982 | Takahama | 364/560 |
| 4,390,865 | 6/1983 | Lauro | 340/347 |
| 4,395,630 | 7/1983 | Ramsden et al. | 250/237 |
| 4,443,788 | 4/1984 | Breslow | 340/347 |
| 4,524,347 | 6/1985 | Rogers | 340/347 |

OTHER PUBLICATIONS

Heidenhain Gauge Head Brochure (2 pages undated).

*Primary Examiner*—Thomas H. Tarcza
*Assistant Examiner*—David Cain
*Attorney, Agent, or Firm*—Dority & Manning

[57] ABSTRACT

An apparatus and method for analyzing a pair of analog, generally sinusoidal, quadrature gauge signals from a conventional plunger-type gauge head includes digital ratio-metric comparison of signals using floating high and low reference conversion values for analog-to-digital conversion, such values being selectively obtained from the gauge signals and their complements. Intra-quadrant distance values are optionally scaled for detected variations in actual quadrant distance values from assumed nominal values therefor. The intra-quadrant distance value is summed with whole and partial signal cycle distance values to determine a total distance value for a given plunger movement.

31 Claims, 4 Drawing Sheets

ANALYZING ANALOG QUADRATURE SIGNALS

BACKGROUND OF THE INVENTION

This invention concerns generally analysis of signals generated by a sensing device, and in particular concerns a method and apparatus for digitally resolving a pair of analog signals produced in phase quadrature by a conventional plunger-type gauge head responsive to movement of a plunger thereof.

Taking precise measurements of distances or displacements is often critical for quality control aspects of industrial processes. For example, parts often need to be manufactured to specific tolerances. Such parts could be processed along a conveyor belt, where they could be automatically measured for the accuracy (i.e. acceptability) of one or more of their critical dimensions. Those found to be out of tolerance could be automatically removed, or otherwise flagged for further attention. The need for precision can extend down to the single micrometmer level, and even fractions thereof. With the current general state of technology, measurements beyond 0.1 micrometers would generally not serve any practical purpose for some processes such as producing a work piece, but an accurate and repeatable measurement to such level can be useful. However, difficulty generally exists when working at such levels of precision, since almost any type or source of error in taking measurements or analyzing measurement signals will be highly significant.

Various devices exist for the purpose of making relatively high-precision measurements. One conventional device is a plunger-type gauge head, such as distributed by the Heidenhain Metro Company of Elk Grove Village, Ill. Generally, a plunger or shaft mechanism extends from a unitary gauge head and is fixed to an enclosed graticule having a predetermined grating pitch, such as about 10 micrometers. As the extended plunger or shaft is displaced by the distance to be measured, the graticule is also moved by precisely the same distance relative a light source on one side thereof and a pair of photocell elements on the other side thereof. Generally, each of the photocell elements produce a signal having an amplitude which varies in direct proportion with the amount of light received by such photocell element.

Without any plunger (i.e. graticule) movement, the photocell or light detecting elements produce a pair of DC signals, since there are no variations in the amount of light received. During graticule movement, such elements produce a pair of analog, generally sinusoidal, quadrature signals. The number of periods of such signals (which may for example be in the hundreds or more for a given plunger movement) is related to the distance moved by the graticule since the physical interruption of light by the grating thereon produces the sinusoidal signals. The quadrature relationship of such signals is due to the specific placement of the photocells from one another relative the grating pitch; as understood by those of ordinary skill in the art.

In general, each signal cycle indicates specific plunger movement, with the length of the cycle being related to the grating pitch of the graticule. If such pitch is 10 micrometers, for example, then each complete signal cycle (i.e. full period thereof) indicates 10 micrometers of plunger movement. Thus, the distance moved by the graticule (and hence the plunger) may be readily determined to a resolution of 10 micrometers by simply counting the number of whole signal cycles resulting from a given movement. The accuracy of such measurements is thus limited by the resolution of partial signal cycles for a final, uncompleted cycle of movement.

In general, one approach to such partial signal cycle resolution includes scaling the total movement value of a gauge signal cycle by the amount of partial movement within the final, uncompleted cycle. Since a full cycle is defined by 360 degrees of angular displacement of a gauge signal, partial cycle movement may be conveniently expressed as a number of degrees of angular displacement. A mathematical solution for such expression within an uncompleted signal cycle is provided by calculating the arc sin of the position amplitude divided by the maximum peak amplitude. In general, with respect to resolution accuracy, the critical value of such solution concerns measurement of the position amplitude.

One known solution for resolving analog, quadrature gauge signals from a typical gauge head (and particularly for determining the above-referenced critical position amplitude value) is the repeated segmentation (i.e. division) of such signals by electronic circuitry. However, in order to increase such resolution, it is necessary to increase the level or number of repetitions of such division. Each increase in division level requires virtually exponential increases in the number of additional circuit elements. As is well known, electronics are subject to inaccuracies caused by error and drift in the circuits due to changes in surrounding temperature, humidity, aging of the circuit elements and the like. The cumulative effects of such problems will obviously only be compounded by additional levels of circuitry. Furthermore, each additional level of circuitry adds to the cost of such resolving technique. Also, such technique compounds initial problems with the gauge signals themselves, such as any type of mismatch in the signal levels output by the pair of light detecting elements.

Another existing technique for resolving gauge signals to obtain the position amplitude and maximum peak amplitude values generally involves conversion of the analog gauge signals into digital signals, with subsequent processing thereof by digital electronics such as a microprocessor. U.S. Pat. No. 4,390,865 issued to Lauro is one example of a position measuring apparatus utilizing analog-to-digital conversion of measurement signals. While a digital processing approach favorably contributes to the accuracy of such technique, the required analog-to-digital conversion is generally a source of significant errors, which limit the accuracy and repeatability of relatively high-resolution measurements.

For example, as generally known in the art, analog-to-digital conversion typically involves successive approximations relative predetermined reference values. Such references are usually electronically produced, which means they are subject to fluctuation, just as are the analog circuits discussed above. Variation in such references from their intended predetermined values adversely affects the accuracy and repeatability of the analog-to-digital conversions. Even expensive methods of producing supposedly high-precision conversion references are subject to variation sufficient to be significant when attempting gauge signal resolution down to whole and fractional micrometers.

Furthermore, inaccuracies may occur when detecting signal zero-points or crossing-points for the purpose of determining the passage of whole and partial signal cycles. For example, basic signal amplitudes may relatively vary between the pair of gauge signals, such that crossing points thereof are distorted. Also, any differences in the basic DC levels of such pair of analog gauge signals may result in distortion of the crossing points. Either type of error tends to shift the distance value of whole and partial signal cycles from their nominal values, which accounts for a further possible source of error during attempted high-accuracy resolution of gauge signals.

SUMMARY OF THE PRESENT INVENTION

The present invention generally recognizes and addresses such deficiencies of prior art resolution techniques, as well as others. Generally, it is an object of this invention to provide both an apparatus and a method for performing accurate and repeatable high-level resolution of gauge signals, such as analog, quadrature gauge signals produced by a conventional plunger-type gauge head, for the purpose of determining the amount of plunger movement thereof.

In general, it is a present object to provide measurements accurately repeatable for high resolutions, such as 0.1 micrometers, while using a minimum of circuit components to thereby reduce opportunities for the introduction of errors. It is a more particular object to provide a generally digital resolution apparatus and method utilizing an analog-to-digital conversion of analog gauge signals, while providing conversion reference values therefor which are, in general, relatively insensitive to environmental changes, such as temperature and humidity, and other types of inaccuracies normally associated with the generation of conversion reference values.

Yet another object of this invention is to generally improve analysis (i.e. resolution) of analog quadrature signals by automatically detecting and correcting for variations of represented signal cycle lengths (due to crossing point distortions or the like) relative nominal values thereof.

It is another aspect of this invention to provide an apparatus in accordance with the present method adapted for accepting signals from a plurality of gauge heads, and providing a plurality of processed distance value outputs, such as to drive a display for such distance values or to provide data for handling (such as statistical analysis) by a higher-level process controller. In doing so, it is an object to provide an enclosable apparatus for analyzing gauge signals, which apparatus may be operated in a harsh or oil ladened environment, without degradation in the performance thereof.

The foregoing objects of this invention, and many others which are evident from the remainder of this disclosure, are variously achieved with different combinations of features and steps presently disclosed. Various combinations of such features, elements, and steps may comprise different embodiments of an apparatus or method in accordance with the present invention. Specific exemplary embodiments of both the present method and apparatus are set forth in the present specification.

One example of an exemplary apparatus for analyzing a pair of analog, generally sinusoidal signals in phase quadrature produced by a conventional plunger-type gauge head responsive to movement of the plunger thereof, may comprise amplifier means for receiving a pair of analog signals from a gauge head, and for amplifying and outputting same and respective complements of same; quadrant status means, responsive to the amplified signals and their complements, for dividing each cycle of one of said amplified signals into four quadrants, and for producing a status indication of which quadrant the one amplified signal is in at a given time sample; converter means responsive to the pair of amplified signals and their respective complements for selectively converting at a given time sample three of such four signals from analog to digital representations, and for selecting and using two of such three signals as respective high and low references for such conversion; and resolver means for receiving the three digital representations, ratio-metrically comparing the non-reference third of the digital representations with the two selected references, and assigning an intra-quadrant position value thereto, whereby the distance traveled by the plunger of the gauge head within a given quadrant may be determined.

Another exemplary embodiment of an apparatus in accordance with the present invention is directed to an apparatus for high-resolution detection of a given plunger movement associated with a conventional plunger-type gauge head, the gauge head generating a quadrature pair of analog gauge signals having periods related to such plunger movement, the apparatus comprising amplifier means for receiving the analog gauge signals and forming analog signals which are complements, respectively, thereof; comparator means, receiving all four of the analog signals, for determining crossing points of selected pairs of the analog signals, cycle quadrants of such signals being defined by such points; cycle count means, responsive to crossing points determined by the comparator means, for counting whole and fractional signal cycles, with a cycle including four consecutive signal quadrants and with one quadrant defined for each consecutive crossing point; analog switch means, receiving all four of the analog signals, and responsive to the crossing points determined by the comparator means, for selecting three of the four analog signals in accordance with a given quadrant, the three selected signals respectively defining at a given instant of time a high reference value, an intra-quadrant position value, and a low reference value; analog-to-digital converter means for converting the three selected analog signals to digital representives, using the defined high and low reference values as high and low conversion reference values, respectively; and processor means, responsive to the three digital representations, for ratiometrically comparing the intra-quadrant position value to the reference values so as to equate said intraquadrant position value to an intra-quadrant distance traveled by the gauge head plunger; and wherein the processor means further includes summing means, responsive to the cycle count means, for summing the number of whole and fractional signal cycles with the intra-quadrant distance to determine the total distance traveled by the gauge head plunger for a given movement thereof.

One exemplary method in accordance with the present invention includes a method of processing a pair of analog, sinusoidal signals produced in phase quadrature by a conventional gauge head for measuring a given displacement of a plunger associated with such head, the method comprising the steps of receiving the pair of analog signals from the gauge head and producing respective complement signals thereof; generally superimposing such signals and detecting crossing points thereof to thereby define signal quadrants; counting the occurrence of all complete quadrants of movement until reaching a final, incomplete quadrant, and then assigning a movement value to the accumulated count of the complete quadrants; converting final analog values in such incomplete quadrant to digital representations, using one of the analog signals and its respective complement as high and low references for conversion, and designating one of the remaining analog signal and its complement as an intra-quadrant position value ratiometrically comparing such designated remaining digitized signal with the digitized reference signals to determine an intra-quadrant distance value; relating such intra-quadrant distance value to an increment of travel of the gauge head plunger in such final quadrant; and adding such intra-quadrant distance value increment of plunger travel to the assigned complete quadrant movement value to obtain a measurement of the total plunger displacement for a given movement thereof.

A number of further features, elements, and steps of the present invention are disclosed in the remainder of the specification. All modifications and variations to any aspect of this invention which would be readily apparent to one of ordinary skill in the art are intended to come within the scope and spirit of this invention, by virtue of present reference thereto. Furthermore, such modifications and variations are to include any and all substitutions of equivalents or readily apparent reversals for either elements of the present method or steps of the present apparatus.

BRIEF DESCRIPTION OF THE DRAWINGS

A full and enabling disclosure of the present invention, including the best mode thereof, is set forth in the present specification, which includes reference to the appended figures, in which.

Use of like reference characters throughout the following specification and attached figures is generally intended to represent same or analogous elements, feaatures, or steps of the present invention. Furthermore, the following detailed description should be interpreted as generally directed to both the method and apparatus of the present invention, unless otherwise indicated.

DETAILED DESCRIPTION OF THE PREFERRED EMBODIMENTS

Figure 1:
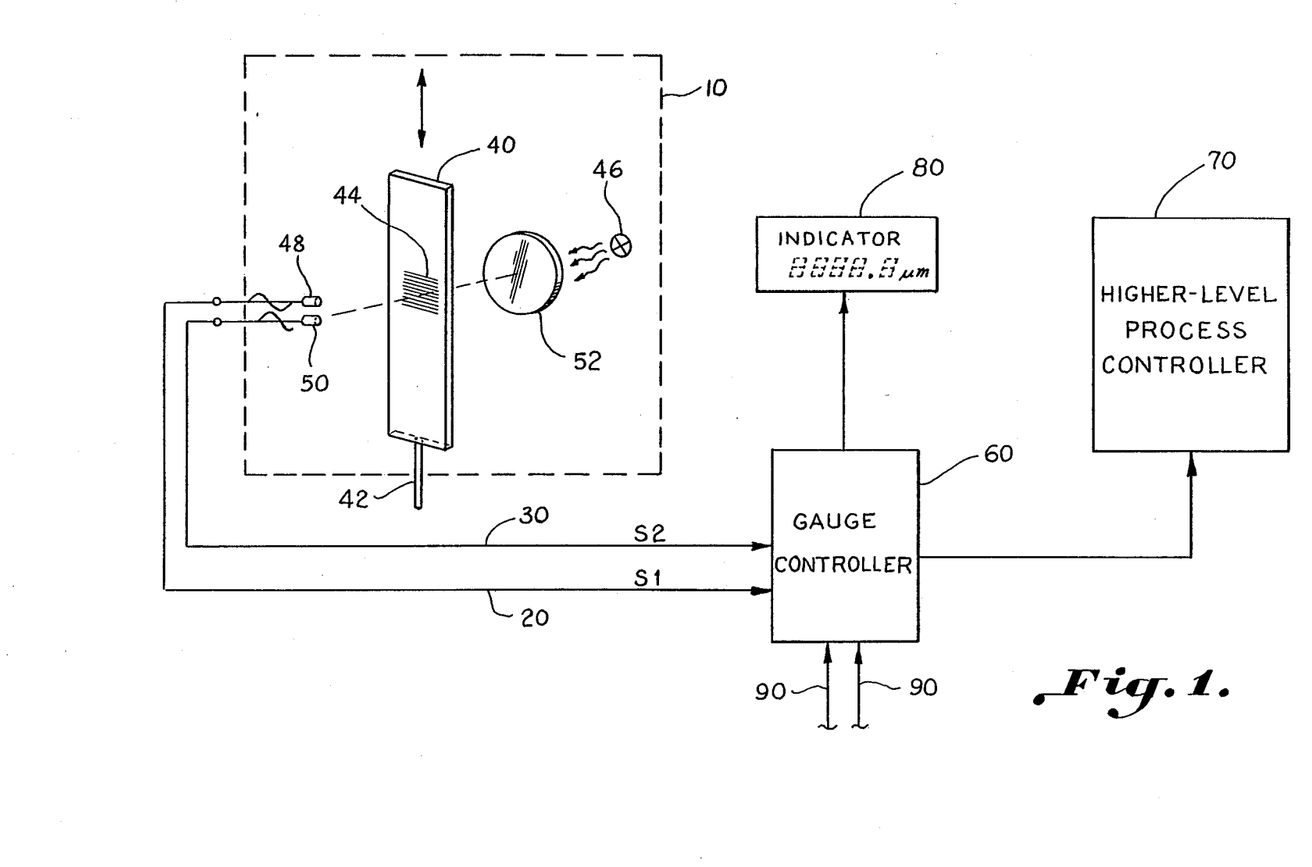
FIG. 1 generally represents in block diagram form at the relationship of the present invention with a conventional plunger-type gauge head and exemplary measurement signals S1 and S2 produced by such gauge head.

FIG. 1 illustrates in block diagram format one exemplary configuration for practice of the present invention with a typical gauge head, in which a pair of gauge signals S1 and S2 are output on lines 20 and 30, respectively, from a conventional plunger-type gauge head 10. As discussed above, gauge head 10 generally includes a movable semi-transparent graticule 40 mounted on a plunger or shaft 42. As plunger 42 is displaced through a given movement (for example, so as to measure a particular distance), grating 44 is correspondingly moved so as to interrupt light produced by a light source 46 and received by a pair of light detecting elements 48 and 50. Condenser lens 52 ensures that light impinging on photocells 48 and 50 is defocused, resulting in the sinusoidal characteristic of gauge signals S1 and S2.

The quadrature relationship of gauge signals S1 and S2 results from the physical placement of photosensors 48 and 50, which are fixedly displaced from one another at a predetermined distance so as to nominally result in sinusoidal signals 90° out of phase, i.e. in phase quadrature. As referenced above, a typical preferred dimension for the pitch of grating 44 on graticule 40 is about 10 micrometers, resulting in a distance value of 10 micrometers for each complete gauge signal cycle. Accordingly, an approximately 90° segment (i.e. quadrant) of a gauge signal would be nominally equivalent to 2.5 micrometers distance traveled by plunger 42.

Signals S1 and S2 from gauge head 10 generally have a range of approximately 7 to 15 micro-amps. The pair of signals are fed directly to an apparatus provided in accordance with the present invention, where they are analyzed and a distance value determined for a given movement of plunger 42. Such apparatus in the block diagram of FIG. 1 is represented by gauge controller 60. Apparatus 60 is termed a "gauge controller" in the configuration illustrated by FIG. 1 because it essentially controls the interface between gauge head 10 and a higher-level process controller 70. For example, displacement of plunger 42, e.g. to measure the depth of a precision cut made in a work piece, is initially represented by raw gauge signals S1 and S2 and then processed by gauge controller 60, so that controller 70 may further appropriately control any process affecting such work piece. Controller 70 may be responsive to relatively straight forward distance data provided in a floating point rotation from gauge controller 60.

Alternatively, since gauge controller 60 preferably includes a microprocessor, it may instead output a more processed signal. For example, gauge controller 60 can be used to "raise a flag" to controller 70 if the detected distance measurement based on the analysis of signals S1 and S2 falls outside a predetermined range of values. Such function by gauge controller 60 would relieve some of the processing duties of such a higher-level controller 70.

In addition to providing various types of outputs to process controller 70, gauge controller 60 may also directly drive an indicator device 80 with appropriate ASCII-type or similar data, which device may indicate the determined distance value with appropriate units, eg. micrometers. Indicator device 80 may comprise an LED, LCD, or equivalent type device.

Inputs 90 of gauge controller 60 are intended to generally represent alternative gauge signals from other gauge heads which may be received and analyzed by a given gauge controller. For example, plunger 42 may be disposed along one axis of a given coordinate system for detecting distances along such axis, and additional gauge heads may be used to produce displacement signal pairs for other axes of the coordinate system. In general, an embodiment of this invention may be provided for accepting desired different numbers of inputs, to suit particular needs and circumstances. Similarly, a plurality of indicator devices 80 could be driven to indicate distances measured in different axes, or the various measurements could be serially displayed on one device. Of course, plural distance determinations for multiple axes or successive measurements for a single axis could also be output to higher-level process controller 70.

Figure 2:
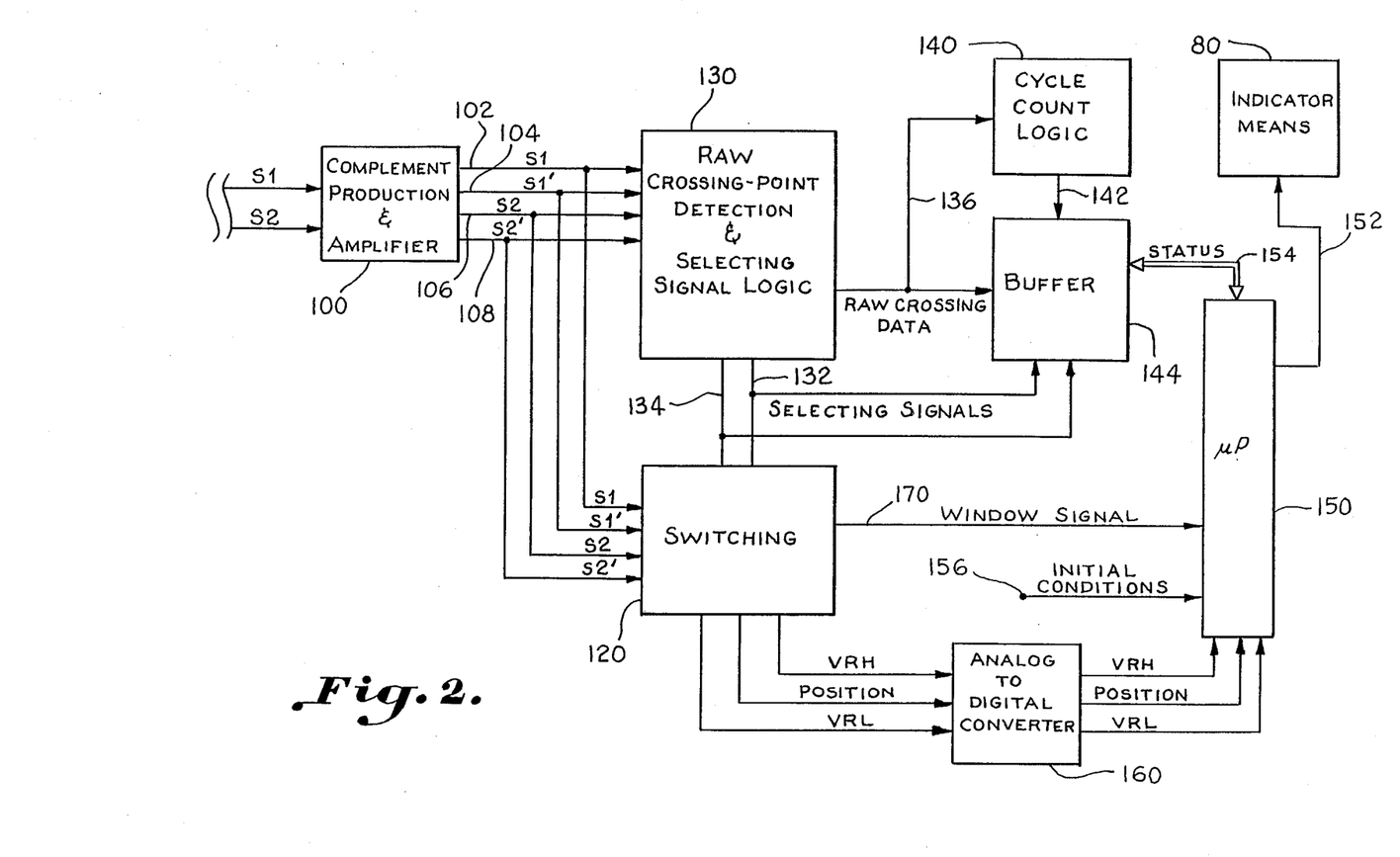
FIG. 2 illustrates a detailed schematic representation of an exemplary apparatus in accordance with the present invention.

FIG. 2 illustrates a detailed schematic view of an exemplary embodiment of an apparatus in accordance with the present invention, as represented in block diagram by gauge controller 60 in FIG. 1. In general, the exemplary apparatus of FIG. 2 is operative in accordance with the present method.

Figure 3:
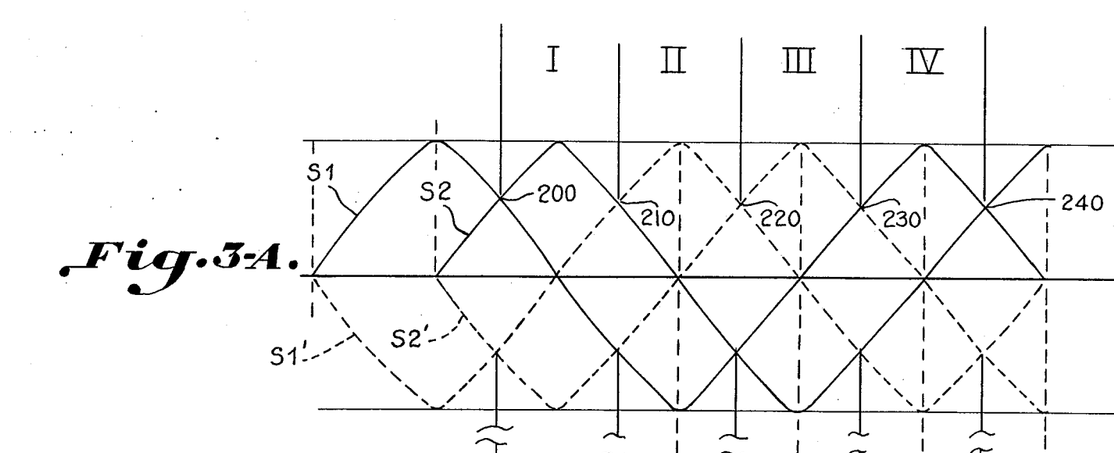
FIGS. 3A and 3B show representative graphs of analysis performed on an exemplary pair of analog, quadrature gauge signals, in accordance with the present method and apparatus.

According to such method and apparatus, a pair of analog, quadrature gauge signals S1 and S2 are received from a gauge head by an amplifier 100. Such amplifier increases signals S1 and S2 from their gauge head level to about 5 volts peak to peak. FIG. 3A illustrates an example of the waveform of such signals S1 and S2 and their phase quadrature relationship.

Amplifier 100 may comprise a multi-channel device which performs an additional function (in addition to amplifying S1 and S2) of providing complements (i.e. inversions) S1' and S2' of the gauge signals, respectively. FIG. 3A illustrates in dotted line such analog gauge signal complements. In general, gauge signal complements are important to the present invention for several purposes, including (but not limited to) the detection of signal crossing points, the provision of conversion references for analog-to-digital conversion, and the provision of an intraquadrant position signal in certain quadrants of plunger movement (all of which are discussed in detail below).

All four analog signals (i.e. the gauge signals and their complements) are produced with respect to each other under stable conditions by preferably providing multi-channel amplifier 100 as a single integrated circuit element, such as an LF347. By providing each channel of amplifier 100 on a single substrate, all four of the analog signals thereby produced are commonly affected by environmental and aging factors, so as to be relatively insensitive to same. Also, the present general objects of simplicity and reduced numbers of circuit components are furthered since analog complement signals may be readily and accurately produced with such an amplifier.

As discussed above, variations of absolute conversion references can occur for a variety of reasons, and such variations can ultimately generate accuracy and repeatability errors for distance measurements. Generally in accordance with the present invention, such errors related to unintended fluctuations of conversion references are eliminated through the practice of using a pair of floating reference signals for high and low conversion references, respectively.

In accordance with this invention, selected pairs of the four analog signals from amplifier 100 are crossed and their crossing points determined. Each signal cycle is divided up into four quadrants, based upon successive of such crossing points. Per the present invention, in each quadrant of plunger movement, one of the gauge signals and its complement are selected for use as the high and low conversion references. Selection of a particular analog signal for use as one of the conversion references depends upon determined quadrant status, as discussed below. Subsequently, such a pair of a gauge signal and its respective complement are ratio-metrically compared with one of the two remaining analog signals to determine an intra-quadrant position value (i.e. the distance the plunger has traveled in a final, incomplete quadrant of movement thereof).

As illustrated by FIG. 3A, each gauge signal is arbitrarily divided into four relatively equi-distant quadrants, which quadrants in the presently preferred exemplary embodiment are based upon the indicated successive pairings of crossing points of the four analog signals, i.e. the gauge signals and gauge signal complements. A quadrant is in this instance defined between adjacent crossing points of like type. For example, quadrant I is defined between crossing point 200 of gauge signals S1 and S2 and crossing point 210 of gauge signal S2 and gauge signal complement S1'. By definition, there are a total of four quadrants in each complete gauge cycle.

FIG. 3B illustrates exemplary selection in accordance with this invention of gauge signals and their complements for high and low conversion reference signals in each quadrant of an exemplary gauge signal cycle. Both $V_{RH}$ (high conversion reference) and $V_{RL}$ (low conversion reference) are shown in solid line in FIG. 3B, and essentially match the upper and lower envelopes, respectively, of the composite waveform of FIG. 3A formed by superimposition of the gauge signals and their complements.

The conversion reference signals in each of the given quadrants generally comprise a pair, which preferably includes one of the gauge signals and its complement. For example, in quadrant I, the high conversion referece signal is original gauge signal S2, while the low conversion reference signal is its complement, S2'. In quadrant II, $V_{RH}$ is equal to S1', while $V_{RL}$ is equal to S1. Moving into the third quadrant, as initiated by crossing point 220 of the two gauge signal complements S1' and S2', $V_{RH}$ is equal to S2', while $V_{RL}$ is equal to S2. In quadrant IV of the exemplary signal cycle, initiated by crossing point 230 and terminated by crossing point 240, the reference conversion values from quadrant II are reversed so that $V_{RH}$ is equal to S1 and $V_{RL}$ is equal to S1'. Of course, the crossing points and reference conversion signal selections continue in the indicated rotation for subsequent quadrant repetitions in latter signal cycles.

As understood from FIG. 3B, each quadrant of plunger movement is determined (i.e. defined) by consecutive, like crossing points (eg. envelope crossings) of various pairs of gauge signals and their complements, with reference conversion values within each quadrant being related to the floating (i.e. changing) values of the selected pair of a gauge signal and its complement.

Generally in accordance with the present invention, while two of the four analog signals S1, S1', S2 and S2' are selected within each quadrant as conversion reference signals (as described above), one of the two remaining (i.e. non-selected) signals is used for ratio-metric comparison with the reference signals to provide an intra-quadrant position signal (i.e. a value related to the distance moved by a gauge head plunger in a final, uncompleted quadrant of movement). An example of such designated position signal for all four repeating quadrants is illustrated in FIG. 3B.

In general, either one of the two remaining analog signals (i.e. not selected to be reference signals in a given quadrant) may be selected for use as an intraquadrant position signal in a given quadrant. However, it is preferred that consecutive selections be appropriately made so that the position signals themselves bridge from one quadrant to the next at a common value. For example, gauge signal complement S1' is illustrated as being selected for the position signal in quadrant I. The value of complement S1' over quadrant I increases from $V_{RL}$ to $V_{RH}$ and at crossing point 210 complement S1' shares a common value of $V_{RH}$ with the signal selected to serve as the position signal in the next quadrant.

Alternatively, S1 could have been selected as the position signal for quadrant I, but its ending point at $V_{RL}$ (point 250) would not have matched signal levels at point 210 with the position signal selected for quadrant II. Thus, when going from quadrant I to quadrant II, the position signal value would have had to make a discontinuous jump from crossing point 250 upwards to crossing point 210. Such discontinuous jumps may cause signal level error which can interject resolution error, and thus are not preferred. FIG. 3B illustrates a preferred exemplary scheme of selecting position signals so that there is relative continuity therein when switching from one quadrant to the next.

As understood from FIG. 1, the angular valve at any point along the selected composite position signal of FIG. 3B is directly related to a movement distance value for plunger 42. In accordance with the present invention, to determine such movement distance value within a quadrant, the selected position signal may be ratio-metrically compared with the selected upper and lower reference signals.

For example, in quadrant III signal values may be selected at an instant of time, such as represented by the three exemplary values 260, 262, and 264 of FIG. 3B. Since such three values will have been converted from their analog value to digital representations (generally in accordance with this invention), the resolution of the ratio-metric comparison will depend simply on the number of bits of the analog-to-digital converter utilized. For example, if an eight bit analog-to-digital converter is used (a relatively low bit number), a total of 256 values may be assigned for the resolved position value. Once the position amplitude is so resolved relative the peak amplitude, the arc sign calculation discussed above in the Background of this invention may be used to determine an intra-quadrant angular displacement.

Another aspect of this invention concerns appropriate manipulation of the information presented by the three composite signal waveforms of FIG. 3B so that proper intra-quadrant distance values are ultimately assigned. For example, position signal value 262 should equate to a movement distance value of about one-third of a quadrant, as may be visually approximated from FIG. 3B. However, while the position signal selected in quadrant IV is chosen such that its beginning value (at crossing point 230) substantially corresponds to the ending value of the designated position signal in quadrant III (for reasons discussed above), a mathematic inversion must be made in quadrant IV so that an accurate intra-quadrant distance value is determined.

Visual inspection of FIG. 3B will confirm that values 270, 272, and 274 generally represent movement through about one-third of a quadrant (similar to values 260, 262 and 264), but the raw ratio-metric comparison value of 272 will not be similar to that of value 262. The difference therebetween occurs because value 262 is on an ascending position signal function, while value 272 is on a descending position signal function. Hence, it is necessary to convert the position indications in quadrant IV (to match quadrant III-type results) such that the initial value thereof is equated to a "zero" plunger position as movement just begins in the fourth quadrant. Such conversion may be accomplished by mathematically inverting position signal values in descending function quadrants, such as exemplary quadrants II and IV of FIG. 3B. Knowing when it is necessary to convert may be accomplished with quadrant status monitoring, as discussed further below.

FIGS. 3A and 3B and their related discussion are particularly descriptive with respect to resolution of intra-quadrant movement values in accordance with the present invention, for example, during a final uncompleted quadrant of plunger movement. Total movement value for a given plunger movement may be determined generally in accordance with this invention by detecting and accumulating the total number of whole quadrant occurrences leading up to a final, incomplete quadrant of movement, and summing their movement (i.e. distance) value with the determined intra-quadrant distance value. Since four quadrants define each complete signal cycle, whole and partial cycles of movement may be detected, counted, and assigned nominal values, with a movement value of 10 micrometers assigned for each wole cycle and 2.5 micrometers for each whole quadrant. Hence straight forward combination of whole and partial cycle distance values with the final intra-quadrant distance value will yield a total distance value for a given movement of plunger 42.

Referring again to FIG. 2 and exemplary apparatus of this invention, amplifier 100 produces gauge and gauge complement signals on the four respective outputs 102, 104, 106, and 108 thereof. Since amplifier 100 is preferably a multi-channel integrated circuit device formed on a single substrate, all four analog signals commonly track changes in environmental conditions.

The four analog signals from amplifier 100 are provided to analog switching device 120, which may comprise integrated circuit devices, such as HC4052 devices. Analog switching mechanism 120 receives the four analog signals, and responsive to a pair of selecting signals which change with each gauge signal quadrant (as discussed below), outputs three particular of the analog signals designated as $V_{RH}$ (high conversion reference value), position (intra-quadrant position value), and $V_{RL}$ (low reference conversion value). Essentially, analog switch 120 receives the four analog waveforms illustrated in FIG. 3A, and responsive to the selecting signals, outputs the three selected analog waveforms illustrated in FIG. 3B.

Amplifier 100 also outputs the four analog signals to comparator and selecting logic 130, which essentially produces raw (i.e. unprocessed) indications of signal crossing points (as discussed below) and twobit binary selecting signals on lines 132 and 134. The two-bit code carried on lines 132 and 134 uniquely identifies which of the four arbitrarily designated quadrants the plunger is presently located in.

While FIG. 3A exemplifies the present methodology that all four analog signals may be superimposed on one another and their crossing points then detected, various comparator schemes may also be utilized for actually detecting crossing points. A single comparator can only compare two signals. Hence, a plurality of comparators may be used for comparing a plurality of pairs of signals, thereby performing the equivalent function as superimposing all the signals and then extracting particular crossing points thereof. For example, a plurality of comparator devices such as LM2901 may be used to indicate raw crossing-point data for all possible combinations of the four analog signals. The raw crossing-point determinations may be processed as understood by one of ordinary skill in the art, for example with Nand Gate Logic (using Nand Gate devices such as HC132), to provide an arbitrary two-bit code which defines the selecting signals on lines 132 and 134. In principle, such selecting signals need only establish a two-bit code uniquely referring to the arbitrarily selected four quadrants I through IV.

Analog switching mechanism 120 is responsive to such selecting signals to select particular groups of three of the four analog signals for each respective quadrant, as illustrated by FIGS. 3A and 3B. For example, in a crossing-point condition as represented by arbitrarily designated quadrant I, analog switching mechanism 120 will function so as to select gauge signal S2 and its complement S2' as the high and low conversion reference values, respectively, and utilize gauge signal complement S1' as the position signal value. Upon moving into quadrant II, a change of quadrants is indicated to analog switching mechanism 120 by selecting signals 132 and 134, and such mechanism shifts its selected outputs so that the high and low reference conversion values become signal complement S1' and signal S1, respectively, and the position signal value becomes gauge signal S2. A similar pattern of switching functions occurs for quadrant III and IV as understood from the illustrations of application FIGS. 3A and 3B, and then the entire cycle of four consecutive quadrants is repeated for each following gauge signal cycle.

The raw crossing-point detection and production of selecting signals functions of device 130 are generally equivalent to a means for determining quadrant status of a gauge signal. Such information, and components thereof, are useful for determining the distance value to assign to a given plunger movement. In particular, raw crossing-point data derived from the comparators included within device 130 is fed along line 136 to cycle count logic device 140. Such cycle count logic may include digital integrated circuit counters such as an HC193, which function to accumulate indications of crossing-point occurrences.

Alternatively, raw crossing point data could be fed directly to microprocessor 150 which could be readily programmed to handle a quadrant occurrence accumulation function, but separation of such function into a separate device as illustrated by present FIG. 2 relieves the microprocessor of some high speed duties it would otherwise have. Accumulated data from the cycle count logic 140 is forwarded on a line 142, as well as the raw crossing point data, to a buffer area 144, which may comprise digital devices such as HC541 integrated circuit chips. Such buffer area also directly receives the two-bit binary code selecting signals 132 and 134 relating to quadrant status determination of the gauge signals for proper time coordination of cycle count data from device 140 and raw crossing-point data from device 130.

While various devices may be utilized, it is preferred that a microprocessor 150 be used for performing the above-mentioned ratio-metric comparison step and others of the present method and apparatus. Different microprocessors may be used, but in one exemplary embodiment an HC11 microprocessor chip is preferred since it already includes an eight bit analog-to-digital converter, which may be used to perform the functions of converter 160 (pictured separately from microprocessor 150 in present FIG. 2). Essentially, the function of an analog-to-digital converter such as a separate converter 160 or an internal converter of microprocessor 150 is well known, and generally involves a successive approximation technique.

In the exemplary embodiment of FIG. 2, the respective digital representations of the three selected signals emerging from converter 160 are forwarded as inputs to microprocessor 150, where they are resolved and equated with an intra-quadrant position value, eg. as discussed above with reference to FIG. 3B, and exemplary position values 262 and 272. Use of a microprocessor 150 for such ratio-metric comparison function is preferred since it may also be appropriately programmed to automatically perform the above-mentioned mathematical inversion for decreasing position value signal functions, eg. quadrants II and IV of FIG. 3B.

Microprocessor 150 may provide outputs generally as discussed with reference to gauge controller 60 of FIG. 1, for example including an output 152 which provides a cumulative distance value to indicator means 80 concerning a given movement of plunger 42. In determining such cumulative distance values, microprocessor 150 also includes information derived from status indication line 154. Microprocessor 150 makes demand for such status information (which includes quadrant data i.e. what quadrant the gauge signal is in and the timing thereof), cumulative cycle count information for observed complete signal cycles, and inter-quadrant count information for each incomplete cycle of movement (i.e. the number of completed quadrants in the last, incomplete cycle). Of course, an intra-quadrant distance value is directly resolved by microprocessor 150 based upon the three digital representations input thereto. Microprocessor 150 uses such signals plus the quadrant status information to know when mathematical inversion of a descending position function signal is desired. Otherwise, microprocessor 150 is not involved in selecting or producing raw data, but instead merely processes incoming data.

Further, before finally determining what distance value for a given plunger movement should be indicated on output line 152, microprocessor 150 can be adapted to consider initial condition values fed thereto on line 156. For example, if the present apparatus is being utilized to measure successive cuts or manipulations relative a work piece, it may be desireable to account for off-set or biasing values during processing, or events other than desired cuts affecting measurement data. In such instance, initial conditions (and others) affecting the desired determination of a distance value may be input to microprocessor 150 along line 156 and subsequently appropriately accounted for in the distance movement value reflected by indication means 80.

It is yet another aspect of the present invention that intra-quadrant distance values may be adjusted to correct for variations in actual quadrant distance values from nominal values therefor, as discussed in the above Background with exemplary reference to DC off-set and amplitude errors during generation of the original gauge signals.

For a variety of reasons, of which DC off-set and amplitude errors in the original gauge signals are two, the actual distance value of a given quadrant may vary from the 2.5 micrometer nominal value therefor. as further example, grating pitch 44 of a gauge head graticule 40 may not be precisely 10 micrometers, or photocell elements 48 and 50 may not be precisely separated by a value equating to a distance of 2.5 micrometers. Thus, individual quadrants may vary in their respective distance values from the nominal 2.5 micrometer value thereof.

Figure 4:
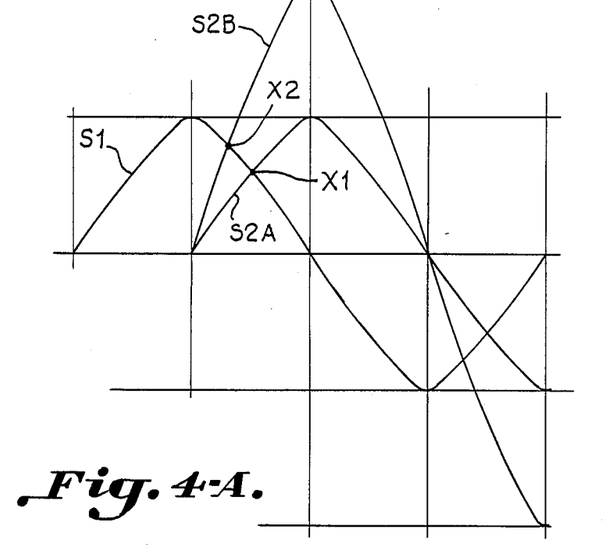
FIGS. 4A and 4B illustrate examples of signal crossing-point distortion due to amplitude and DC offset variations, respectively, of the original gauge signals, for which practice of the present invention can correct.

Present FIGS. 4A and 4B illustrate examples of two conditions which can cause shifting of signal crossing points, which results in distortion of the actual distance value for a given quadrant of the gauge signal from its nominal value of 2.5 micrometers. For example, with reference to FIG. 4A, quadrature gauge signals S1 and S2A are illustrated as having substantially equivalent amplitudes, which would normally be the case if photocell detectors 48 and 50 had substantially matched output levels. However, if one photocell element has a different output level from the other, different gauge signal amplitudes will result.

Gauge signal S2B of FIG. 4A is an analog sinusoidal signal in phase quadrature with gauge signal S1, but of a different amplitude than S2A. The amplitude difference between gauge signals S2A and S2B is exaggerated for clarity in demonstrating the effect of such difference on crossing points. The crossing point of relatively amplitude-matched gauge signals S1 and S2A occurs at point X1, as illustrated by FIG. 4A. However, as further illustrated by such figure, the crossing point for gauge signals S1 and S2B (having essentially unmatched amplutides) is moved to a point X2, occurring much earlier relative the axis of FIG. 4A than crossing point X1. Thus, amplitude differences between such quadrature gauge signal pairs cause their crossing points to be altered, which distorts the distance value of the affected quadrant from its nominal value. Such distortion can obviously result in significant inaccuracies when measuring plunger displacement. Of course, due to electronics of the gauge head (such as aging of the photocells, etc.), the relative amplitudes of gauge signal pairs can vary over time as well as being initially mismatched. Such variation provides further sources of distance determination error.

Similarly, as illustrated by FIG. 4B, DC offset errors between the photocell elements of a gauge head can result in quadrant distance value distortions. For example, if a gauge signal S2B of FIG. 4B has a DC off-set value of $X_{DC}$ from an original pair of quadrature gauge signals S1 and S2A, the crossing point X2 of such S2B and S1 gauge signals will again be shifted forward along the axis of FIG. 4B relative the original crossing-point X1 of gauge signals S1 and S2A of FIG. 4B.

The present invention recognizes and addresses such quadrant distance value distortions, and produces a corrected intra-quadrant distance value to account for detected distortions. In general, in accordance with the present invention, a basic assumption is made that each complete gauge cycle has a distance value of 10 micrometers, since that is typically a substantially accurate characteristic based on the physical grating of the gauge head, and not dependent on any electronics. A history of crossing points is kept for a given plunger movement and compared with the assumed value of 10 micrometers per each complete gauge cycle so as to find deviations therefrom.

More specifically, in the present exemplary embodiment, a "window signal" 170 (FIG. 2) is forwarded from analog switching mechanism 120 to an input of microprocessor 150. Such window signal in principle is related to the timing of crossing-point occurrences, and in the presently preferred embodiment is typically a function of the two-bit binary selecting signals 132 and 134. Hence, the window signal changes in direct correspondence with the timing of changes in detected quadrant status (i.e. quadrant status timing). For example, one preferred technique of obtaining the window signal itself is to combine selecting signals 132 and 134 in an XOR function so that the window signal changes between two discrete values (high and low) for interpretation by microprocessor 150 as the timing of quadrant status changes (at least pairs thereof). Since a general assumption is made that a complete signal cycle distance value will remain at 10 micrometers, variations in quadrants may deductively be compared in 10 micrometer groupings for determining actual quadrant distance values.

In principle, such actual distance values may be variously obtained. In the presently preferred embodiment of this invention, the window signal is moitored by microprocessor 150 with respect to time so as to determine a group of 20 to 30 pulses which have a constant acceleration function. Once such a grouping of constant acceleration pulses is determined, a straight-forward second order differential equation analysis may be carried out by microprocessor means 150 so as to obtain actual distance information for such quadrants. Then, a scalar multiplying value may be determined for scaling the initial ratio-metric conversion value for an intra-quadrant distance value, before such distance value is added to the representative distance for the number of whole gauge signal cycles and whole inter-quadrant occurrences to determine a total distance movement value.

For example, if it were determined that an acutal quadrant distance value were more than its 2.5 micromemters nominal value (e.g. 2.65 micrometers), then a scalar slightly larger than 1.0 (e.g. 2.65 divided by 2.5) would be multiplied by the intra-quadrant distance value for that quadrant so that the full value for that quadrant might be reflected. In such manner, the final distance value determined for a given movement of plunger 42 is automatically corrected for variations in gauge signal DC off-set and amplitude variations, and other factors which affect crossing-point occurrences and hence distort movement value determinations.

While various analog-to-digital converters of different bit sizes may be utilized in a given embodiment of the present invention, an eight-bit analog-to-digital converter is sufficient to provide a theoretical repeatability of approximately 0.01 micrometers since a 2.5 micrometer quadrant segment can be resolved into 256 bits. In this instance, "repeatability" strictly concerns measurement limitations as a function of the gauge controller electronics.

By comparison, the term "accuracy" would include a greater number of factors (including those from the gauge head itself), all affecting absolute accuracy. Thus, repeatability in the present context is concerned with the ability of providing the same measurement whenever the plunger repeatedly is moved through the same displacement.

The theoretical repeatability of 0.01 micrometers for this invention is slightly limited by "uncertainty" generated in the electronics, e.g. slight delays from real time operation of the comparators. A typical value of the uncertainty caused by such source might be equivalent to only about 0.003 micromemters. Hence, in round figures, the practical limit on repeatability with the present invention is about 0.02 micrometers (0.01 micrometers for the uncertainty and 0.01 micrometers for resolution limit).

One advantage of having practical repeatability down to 0.02 micrometers is the ability to obtain more accurate rounding of numbers. In many situations, a lower limit of 0.1 micrometers is a practical limitation with respect to all parameters of a process. However, repeatability down to 0.02 micrometers permits accurate rounding to the tenths of micrometers. For example, 0.14 micrometers and 0.16 micrometers can be accurately rounded to 0.1 and 0.2 micrometers, respectively.

While the principles of the present method and apparatus, and specific exemplary embodiments thereof, have been fully disclosed, one of ordinary skill in the art will recognize many modifications and variations to such method and apparatus without departing from the spirit thereof. All such variations are intended to come within the scope of the present invention.

For example, output 152 of microprocessor 150 may assume different forms, with ASCII readable numbers being one preferred example. Also, if an apparatus in accordance with the present invention (such as gauge controller 60 of FIG. 1) is to be connected with a statistical device such as a higher-level process controller 70, an output from microprocessor 150 may take the form of a floating point number which is readily accepted and operated on by such statistical higher-level machine 70.

While exemplary embodiments of both the present method and apparatus have been described in detail above, all such description is intended as words of description and example only, and not words of limitation, which appear only in the following claims.

What is claimed is:

1. An apparatus for analyzing a pair of analog, generally sinusoidal signals in phase quadrature produce by a conventional plunger-type gauge head responsive to movement of the plunger thereof, said apparatus comprising:
    amplifier means for receiving a pair of analog signals from a gauge head, and for amplifying and outputting same and respective complements of same:
    quadrant status means, responsive to the amplified signals and their complements, for dividing each cycle of one of said amplified signals into four quadrants, and for producing a status indication of which quadrant said one amplified signal is in at a given time sample; converter means responsive to said pair of amplified signals and their respective complements for selectively converting at a given time sample of such four signals from analog to digital representations using respective high and low reference values for such converting, and for selecting and using two of such three signals as said respective high and low references; and
    resolver means for receiving said three digital representations, ratio-metrically comparing the nonreference third of said digital representations with said two selected references, and assigning an intraquadrant position value thereto, whereby the distance traveled by the plunger of said gauge head as represented by the production of signals within a given quadrant may be determined.

2. An apparatus as in claim 1, wherein:
    said quadrant status means includes comparator means for determining crossing points for various pairings of said analog signals and their respective complements;
    said apparatus further comprises cycle count means responsive to determined crossing points for counting the passage of signal cycles and complete quadrants;
    and wherein said resolver means includes means for receiving the cycle and inter-quadrant count from said cycle count means and summing same with the assigned intra-quadrant position value, which is representative of a final, partial quadrant of plunger movement representative signals, so as to determine the total distance moved by said gauge head plunger during a given movement thereof.

3. An apparatus as in claim 1, wherein said amplifier means comprises an integrated circuit device formed entirely on a single substrate so that the amplified signals and their respective complements commonly track environmental effects so as to be relatively insensitive to same.

4. An apparatus as in claim 1, wherein said high and low references comprise generally floating references which correspond respectively to the upper and lower envelopes defined by superimposing said analog signals and their respective complements.

5. An apparatus as in claim 1, wherein said resolver means includes microprocessor means, responsive to said status indication for summing cumulative signal cycles and whole quadrants with said intra-quadrant position value to determine the total gauge head plunger distance traveled by a given movement thereof.

6. An apparatus as in claim 5, wherein said microprocessor means is further responsive to the timing with which said quadrant status means indicates quadrant changes to determine a normalizing scalar by which said intra-quadrant position value is multiplied before being summed with said signal cycle and whole quadrant data, said scalar adjusting the movement value of a given quadrant to account for variations thereof from a nominal value therefor.

7. An apparatus for processing first and second analog, sinusoidal gauge signals generated in phase quadrature responsive to movement of a plunger associated with a gauge head, for determining the distance of such plunger movement as represented by such responsive signal generation, said apparatus comprising:
    an amplifier for amplifying analog signals received from the gauge head to produce amplified signals thereof and for producing other respective amplified signals which are inverted signals of such analog signals;
    a comparator circuit, responsive to said amplified signals, for producing selecting signals indicative of like types of crossing points of predetermined pairings of said amplified signals, each such crossing point defining one quadrant of a gauge signal cycle;
    a switching circuit, receiving said amplified signals, and responsive to said selecting signals for selectively outputting three of such four amplified signals in a defined quadrant;
    an analog-to-digital converter, receiving such three selectively output signals and outputting respective digital representations thereof relative high and low references, while using relatively higher and lower of said selectively output signals as said high and low references, respectively, for such conversion; and
    a processor or ratio-metrically determining an intraquadrant value for the relatively middle of said three digital representations with respect to the other two thereof, said value corresponding to a defined increment of movement for said gauge head plunger as represented by corresponding signal generation within a defined quadrant.

8. An apparatus as in claim 7, wherein:
said comparator circuit also produces raw crossing point indications of certain crossing points of specific predetermined pairings of said amplified signals;
said apparatus further includes a cycle count and buffer circuit collectively responsive to such raw crossing point indications and said comparator circuit produced selecting signals for determining a cumulative count for the number of gauge cycles and whole quadrants detected; and
wherein said processor assigns a movement value to the accumulated gauge cycles and whole quadrants, and sums same with said determined intra-quadrant value corresponding to intra-quadrant plunger movement for determining the total movement by said plunger in a given movement thereof.

9. An apparatus as in claim 8, wherein said comparator circuit includes selecting signal logic for producing said selecting signals based on said produced raw crossing point indications and other analogous indications produced by said comparator circuit concerning other predetermined pairings of said amplified signals.

10. An apparatus as in claim 7, wherein said switching circuit includes means for producing a window signal indicative of the timing of changes occurring in said selecting signals; and
said processor further includes means responsive to said window signal for determining a correcting multiplying factor by which said determined intraquadrant movement value is multiplied to correct a given quadrant or variations in the movement value of actual plunger movement compared with a nominal value therefor.

11. An apparatus as in claim 10, wherein said selecting signals comprise a two-bit digital code for uniquely identifying the four quadrants comprising a given gauge signal cycle, and said window signal is defined by calculating the exclusive-or function of said selecting signals.

12. An apparatus as in claim 7, wherein said switching circuit selects said high and low references such that they are always comprised of one of said amplified signals and its respective inverted signal, with such references thereby comprising floating references corresponding to upper and lower envelope portions of such amplified signal and its respective invert.

13. An apparatus as in claim 7, wherein said processor comprises a microprocessor, and said analog-to-digital converter comprises an internal eight bit analog-to-digital converter of said microprocessor, wherein said determined intra-quadrant value comprises one of 256 values ratio-metrically determined between said high and low references, said microprocessor also automatically mathematically inverting descending values for correspondence with equivalent ascending values.

14. An apparatus as in claim 7, wherein said gauge head has a grating pitch of 10 micrometers, resulting in a nominal quadrant value of 2.5 micrometers and an intra-quadrant resolution of approximately 0.01 micrometers when using an eight bit analog-to-digital converter capable of resolving such 2.5 micrometer distance into 256 parts.

15. An apparatus as in claim 8, wherein:
said processor comprises a microprocessor; and
said apparatus further comprises an indicator means driven by said microprocessor for indicating the total movement of said gauge head plunger for a given movement thereof as determined by said microprocessor; and
wherein said microprocessor includes an input for setting initial conditions, whereby movement offset values may be selectively included and excluded as desired from the total movement output shown by said indicator means.

16. An apparatus for high-resolution detection of a given plunger movement associated with a conventional plunger-type gauge head, said gauge head generating a quadrature pair of analog gauge signals having periods of predetermined length responsive to corresponding predetermined increments of such plunger movement, said apparatus comprising:
amplifier means for receiving said analog gauge signals and forming analog signals which are complements, respectively, thereof;
comparator means, receiving all four of said analog signals, for determining crossing points of selected pairs of said analog signals, cycle quadrants of such signals being defined by such points;
cycle count means, responsive to crossing points determined by said comparator means, for counting whole and fractional signal cycles, with a cycle being defined by four consecutive signals quadrants, and with one quadrant defined for each consecutive crossing point;
analog switch means, receiving all four of said analog signals, and responsive to said crossing points determined by said comparator means, for selecting three of said four analog signals in accordance with a given quadrant, said three selected signals respectively defining at a given instant of time a high reference value, an intra-quadrant position value, and a low reference value;
analog-to-digital converter means for converting said three selected analog signals to digital representatives, using said defined high and low reference values as high and low conversion reference values, respectively, in said converting operation; and
processor means, responsive to said three digital representations, for ratio-metrically comparing said intra-quadrant position value to said reference values so as to equate said intra-quadrant position value to a uniquely corresponding intra-quadrant distance traveled by said gauge head plunger; and
wherein said processor means further includes summing means, responsive to said cycle count means, for summing the number of whole and fractional signal cycles with said intra-quadrant distance to determine the total distance traveled by said gauge head plunger for a given movement thereof.

17. An apparatus as in claim 16, wherein:
said amplifier means comprises a four-channel integrated circuit-type amplifier formed on a single substrate, thereby rendering said analog signals relatively insensitive to ambient temperature changes, other environmental drift factors, and the effects of aging; and
wherein said high and low reference values selected by said analog switch means always comprise a pair of signals, including one of said analog gauge signals and its respective analog signal complement.

18. An apparatus as in claim 16, wherein said high and low conversion reference values constitute floating conversion references corresponding to the high and low envelopes respectively of said analog signals superimposed with respect to each other.

19. An apparatus as in claim 16, wherein said processor means comprises microprocessor means, generally responsive to said crossing point determinations, for timing and analyzing same with respect to one another for determining a grouping thereof having constant acceleration, and for solving the timing of such determined grouping as a second order differential equation to obtain distance values for assignment of same to particular quadrants of plunger movement, whereby a multiplying scalar value is developed for normalizing a given intra-quadrant position value so as to adapt same for variations in actual quadrant length relative to a nominal value therefor.

20. An apparatus as in claim 16, wherein:
said processor means comprises microprocessor means; and
said converter means comprises an 8 bit analog-to-digital converter integrated circuit; and further wherein
said gauge head has dimensions such that said quadrant has a nominal value of 2.5 micrometers, and resolving of an intra-quadrant position value with such 8 bit analog-to-digital converter results in a theoretical resolution for plunger movement detection of approximately 0.01 micrometers, with a practical resolution of 0.02 micrometers to further account for errors and delays in electronics.

21. An apparatus as in claim 16, wherein said processor means comprises a microprocessor means having an output for driving an indicator means for displaying said total distance traveled by said gauge head plunger for a given movement thereof, said micrprocessor means also being responsive to initial condition inputs for off-setting said total distance by predetermined amounts.

22. A method of processing a pair of analog, sinusoidal signals produced in phase quadrature by a conventional gauge head in direct correspondence with and in representation of a given displacement of a plunger associated with such head, for measuring such displacement, said method comprising the steps of:
receiving the pair of analog signals from the gauge head and producing respective complement signals thereof;
generally superimposing such signals and detecting crossing points thereof to thereby define signal quadrants;
counting the sequential occurrence of all complete signal quadrants representative of corresponding increments of plunger movement until reaching a final, incomplete quadrant, and then assigning a movement value to the accumulated count of the complete quadrants;
converting final analog values in such incomplete quadrant to digital representations, using one of the analog signals and its respective complement as requisite high and low references for such conversion, and designating one of the remaining analog signal and its complement as an intra-quadrant position value;
ratio-metrically comparing such designated remaining digitized signal with the digitized reference signals to determine an intra-quadrant distance value;
relating such intra-quadrant distance value to a corresponding increment of travel of the gauge head plunger in such final quadrant; and
adding such intra-quadrant distance value increment of plunger travel to the assigned movement value of the accumulated count of complete quadrants to obtain a measurement of the total plunger displacement for a given movement thereof.

23. A method as in claim 22, wherein:
said step of detecting crossing points includes the detection of only those crossing points occurring on the envelope of such superimposed signals; and further wherein
the high and low conversion references correspond respectively to the top and bottom portions of the superimposed signal envelope, such portions always including at least one of the analog signals and its respective complement.

24. A method as in claim 22, wherein said receiving and producing step includes the step of providing an integrated circuit amplifier having a plurality of channel circuits formed on a common substrate, whereby changes in ambient conditions are commonly experienced among the channels so as to make such channels relatively insensitive to same.

25. A method as in claim 22, wherein the conventionl gauge head has a grating pitch of 10 micrometers, and four quadrants of nominal 2.5 micrometer length each are defined for each cycle of a signal produced by such gauge head, which cycle corresponds to 10 micrometers of movement.

26. A method as in claim 25, further comprising the steps of:
determining, based generally on the timing of actual crossing point detections, variations in the actual length of a quadrant from the nominal 2.5 micrometer length thereof; and
correcting the intra-quadrant distance value as determined to account for determined variations from such nominal quadrant value before adding such intraquadrant distance value with the complete quadrant movement value, whereby distortions in quadrant distance values caused by relative DC off-set errors and amplitude variations in said pair of gauge head signals are corrected.

27. A method as in claim 25, wherein said converting step includes providing an 8 bit converter for digitizing said remaining analog signal into one of 256 digital values with respect to the selected high and low conversion reference values, whereby a theoretical resolution of approximately 0.01 micrometers for said intra-quadrant distance value is obtainable.

28. A method as in claim 22, wherein said step of ratio-metrically comparing includes the step of selectively mathematically inverting the remaining digitized signal so that its respective function is always increasing with respect to the low and high conversion reference values, whereby a given increment of gauge head plunger travel within a quadrant will result in the determination of a unique intra-quadrant distance value regardless of whether the original function of the remaining digitized signal is increasing or decreasing.

29. A method of resolving gauge signals from a gauge head to determine the distance a plunger associated therewith has travelled, such gauge head producing in phase quadrature first and second analog, sinusoidal gauge signals directly responsive to and corresponding with movement of the plunger such that the consecutive generation of signal cycles corresponds with predetermined increments of plunger travel, said method comprising the steps of:

forming complement analog signals for the respective gauge signals;

detecting non-zero crossing points of selected pairs of such gauge signals and complements thereof to define four quadrants per gauge signal cycle;

summing for a given plunger movement the number of consecutive such crossing point detections to accumulate the corresponding total number of complete cycles and complete inter-quadrant passings in any uncompleted cycle;

within a determined final, uncompleted quadrant of plunger movement, converting a selected three of the four analog signals into digital represntations, using relatively higher and lower valued signals thereof as requisite high and low conversion reference values, respectively, for such analog to digital conversions;

ratio-metrically determining an intra-quadrant positional value corresponding with plunger movement for producing a signal in such final quadrant, based on the three digital representations; and assigning movement values to the accumulated total number of cycles and inter-quadrant passings, and summing such movement value with the determined intra-quadrant positional value, whereby the total distance of a given plunger movement is determined from the correspondingly produced gauge signals.

30. A method as in claim 29, wherein:

said gauge head has a grating pitch of 10 micrometers, resulting in a nominal gauge head signal quadrant distance value of 2.5 micrometers; and wherein said method further includes the steps of determining a normalizing multiplier for adjusting a particular quadrant for variations in the actual distance representation of a given quadrant from the nominal 2.5 micrometer distance value thereof, such variations being induced by advanced or delayed crossing points due to relative differences between either or both of the amplitude and the DC value of the analog, sinusoidal gauge head signals; and adjusting said intra-quadrant positional value with the determined normalizing multiplier before summing same with the assigned movement value, whereby the determined distance of a given plunger movement is corrected for relative variations in the DC offset and/or amplitude characteristics of the pair of gauge head signals.

31. A method as in claim 30, wherein said step of determining the normalizing multiplier includes the steps of:

monitoring the timing of changes in the crossing point detections to determine a timed grouping thereof having constant acceleration;

solving a second order differential equation representative of the timing function of such determined group of constant acceleration crossing point detections to obtain distances corresponding thereto; and determining the normalizing multiplier for a given quadrant based on the variation of such obtained distances from said nominal 2.5 micrometer quadrant distance value.

* * * * *